United States Patent [19]
Berglund et al.

[11] 3,930,938
[45] Jan. 6, 1976

[54] ATTACHMENT AND LOCKING OF FINGER CONTROL RODS IN A NUCLEAR REACTOR OF BWR TYPE

[75] Inventors: Ake Berglund; Antti Suvanto, both of Vasteras, Sweden

[73] Assignee: Asea-Atom, Vasteras, Sweden

[22] Filed: Oct. 4, 1973

[21] Appl. No.: 403,492

Related U.S. Application Data

[63] Continuation-in-part of Ser. No. 290,006, Sept. 18, 1972, abandoned.

[30] Foreign Application Priority Data
Oct. 11, 1971 Sweden.............................. 12819/71

[52] U.S. Cl............... 176/36 C; 176/86 R; 403/349
[51] Int. Cl.².......................................... G21C 7/08
[58] Field of Search........ 176/36 R, 36 C, 86 R, 33, 176/34, 35, 78; 403/349

[56] References Cited
UNITED STATES PATENTS
3,107,209  10/1963  Frisch................. 176/86 R
3,377,252  4/1968  Knights............................ 176/86 R

*Primary Examiner*—Samuel Feinberg

[57] ABSTRACT

In a nuclear reactor of the BWR type having finger control rods mounted in guide tubes and having a member movable upwardly to push the control rods into the guide tubes, the control rods are connected to this member by a joint such as a bayonet joint releasable by turning of the control rods about their longitudinal axis. On the upper ends of each control rod is slidably mounted a sleeve which is spring-pressed downwardly. This sleeve is non-rotatable with respect to the control rod. The sleeve has either a square lower end slidable within a square tube or has projections at its lower end in a round tube having ribs running longitudinally thereof. The arrangement is such that when the support is in its uppermost position the control rods project above the fuel assembly and the sleeve can be raised against the spring action out of the upper ends of the tubes so as to permit turning of the rods to release them for removal.

8 Claims, 9 Drawing Figures

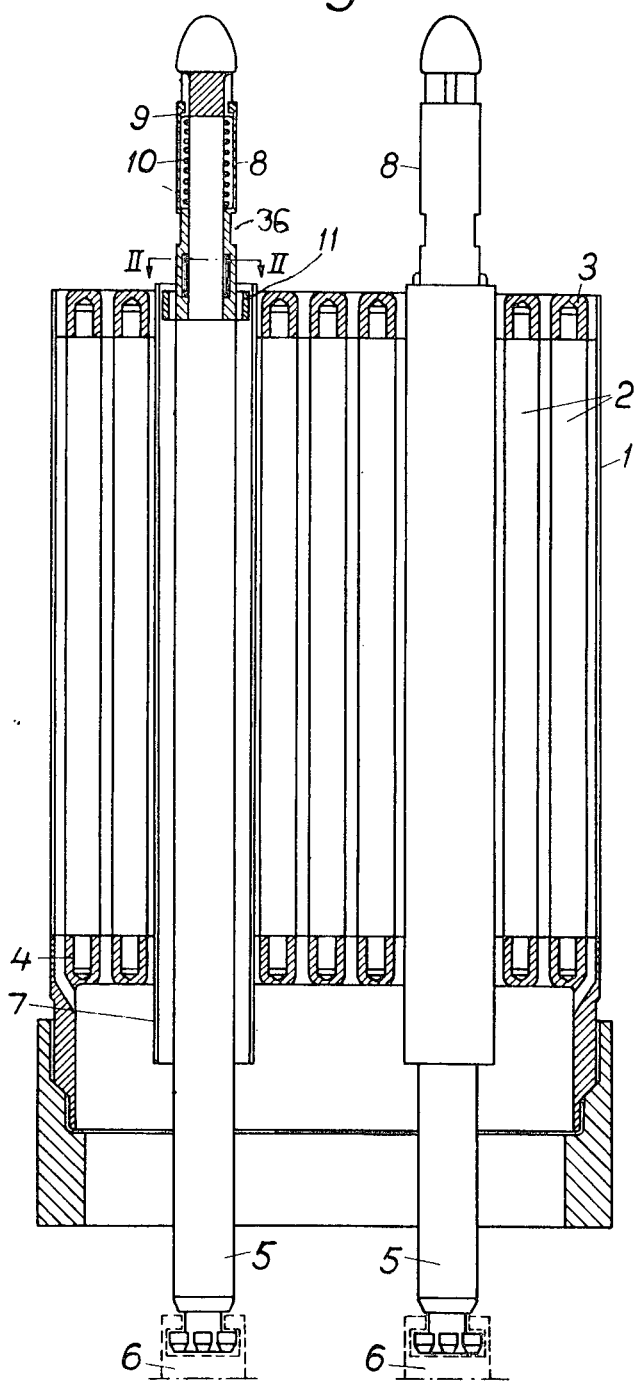
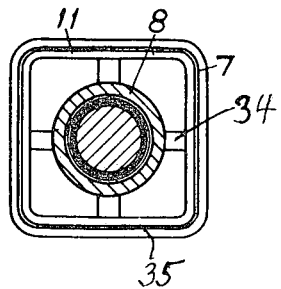
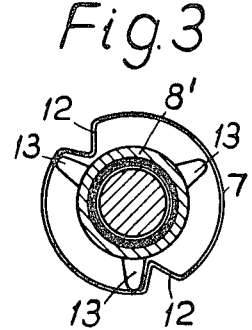

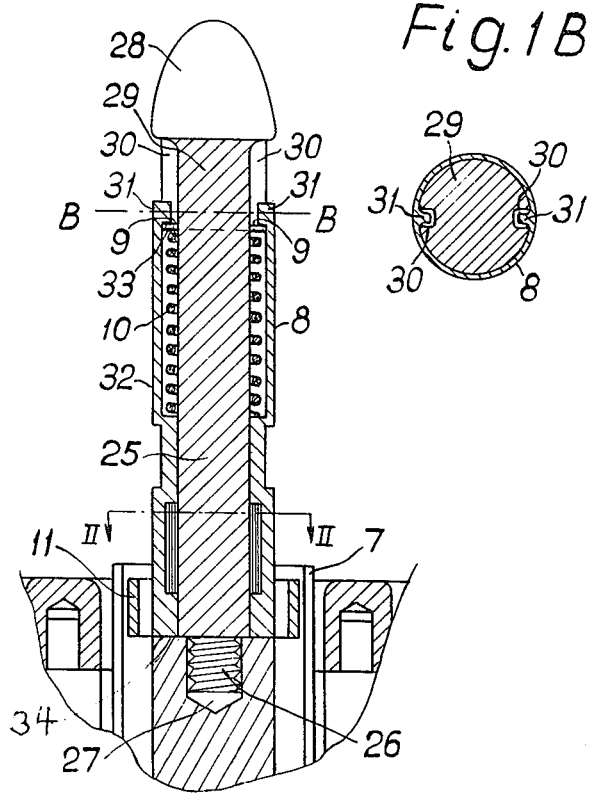

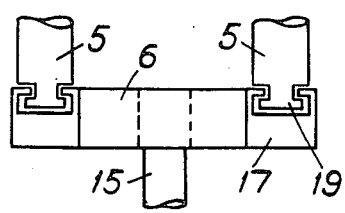
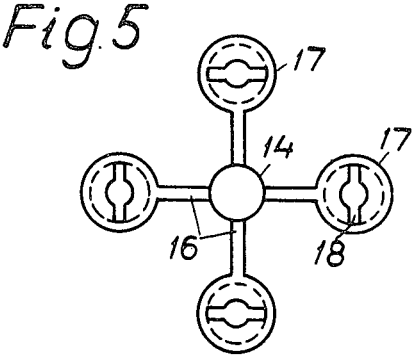
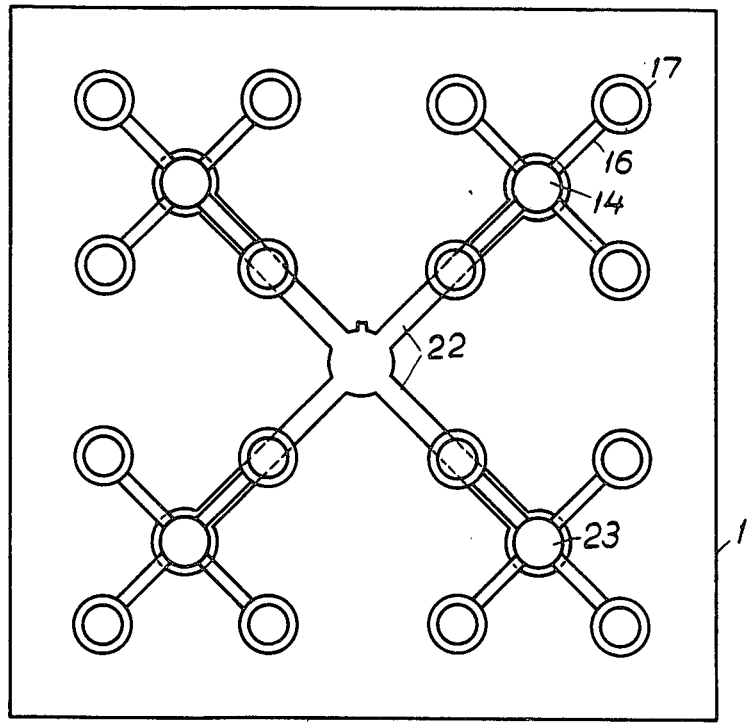
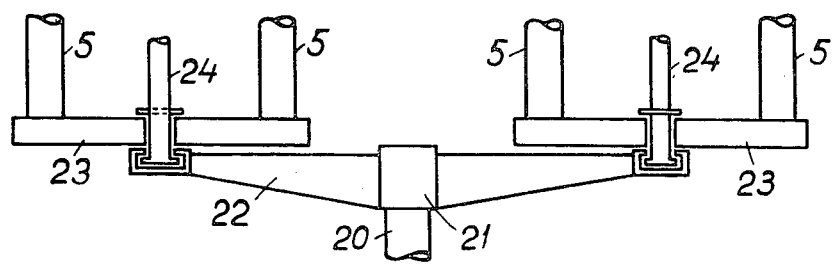

3,930,938

ATTACHMENT AND LOCKING OF FINGER CONTROL RODS IN A NUCLEAR REACTOR OF BWR TYPE

RELATED APPLICATIONS

This application is a continuation-in-part of application Ser. No. 290,006, filed Sept. 18, 1972, now abandoned.

Background of the Invention

1. Field of the Invention

In nuclear reactors of BWR type the control rods are positioned, as a rule, between the fuel assemblies and have cruciform cross-section with their central part located in the free space between four adjacent fuel assemblies and the wings projecting cruciformly from the central part, each of said wings being located between two adjacent assemblies.

2. The Prior Art

Primarily for reasons of economy of fuel, it is desirable, however, to be able to position the control rods inside the fuel assembly and to make them in the form of finger control rods and let them run in guide tubes between the fuel rods. In this arrangement, new problems arise concerning the attachment of the control rods to the control drive and their locking of the attachment device against involuntary influence of the attachment device.

SUMMARY OF THE INVENTION

The present invention relates to a means for attachment and locking of finger control rods in fuel assemblies for nuclear reactors of BWR type. According to the invention, individual control rods or groups thereof are attached, with the help of known fastening devices, at their lower end to a yoke or similar element which can be influenced by the control drive of the control rods. The fastening devices are lockable against involuntary movement by means of locking devices which are arranged in such a manner that they can be operated when the control rods are in their upper position in the core.

In a particularly preferred embodiment of the invention, the locking device is applied at the top of the control rods, said top projecting above or being level with the upper part of the core when the control rods are in their topmost position. Because the locking devices are then visible and easily accessible, the work with the rods is considerably facilitated.

BRIEF DESCRIPTION OF THE DRAWINGS

In the accompanying drawings:

FIG. 1 shows a vertical section through a fuel rod having two finger control rods;

FIG. 1A is an enlarged cross-section of the upper part of the left hand control rod of FIG. 1;

FIG. 1B is a cross-section on the line B—B of FIG. 1A;

FIG. 2 is a cross-section on the line II—II of FIG. 1A;

FIG. 3 shows in similar cross-section a variant of the locking device when circular guide tubes are used;

FIG. 4 shows schematically the principle for attaching four control yard rods to a common yoke;

FIG. 5 is a top plan view of the rod holding member of FIG. 4;

FIG. 6 shows an arrangement for a group of four fuel assemblies operating simultaneously from a common yoke in plan view; and FIG. 7 is a side view of a mechanism of FIG. 6.

DESCRIPTION OF THE PREFERRED EMBODIMENTS

The fuel assembly 1 shown in FIG. 1 has within a cover a number of fuel rods 2 which are attached to end plates 3 and 4. Two control rods 5 are positioned inside the assembly among the fuel rods. The control rods are made in the form of "fingers" and are therefore called finger control rods. The control rods are attached at their lower ends to a yoke 6 which is shown more clearly in FIGS. 4 and 7. The attachment is made by using any known method capable of being released by turning the rod, for example bayonet joint, spring lock, threading, or the like. In the figure the use of bayonet joint is shown. The control rod is displaceable in a guide tube 7 which is attached in the fuel assembly. Between the control rod and the guide tube there is a gap for the water flowing from below, and the gap has such a width that the rod maintains a suitable temperature.

In order to make sure that the control rod is not turned and unintentionally affected so that it gets detached from the fastening device, it is provided at its upper end with a locking device which is shown in a larger scale in FIGS. 1A and B and FIGS. 2 and 3. The control rod 5 has at its upper end an extension constituted by a pin 25 threaded at 26 in a bore 27 in the top of the control rod. The pin 25 terminates at its upper end in a conical top 28 and below this is a cylindrical part 29. Pin 25 and the bottom part of the cylindrical part 29 are surrounded by a sleeve 8. The cylindrical part 29 is provided with two axial grooves 30 and two lugs 31 at the upper end of the sleeve 8 are situated in the grooves. The grooves 30 and lugs 31 allow the sleeve 8 to move axially on the pin, but prevent it from rotating thereon. The cylindrical part 29 has a greater diameter than the rest on the pin 25, and the bottom surface of part 29 outside the lower part of pin 25 forms a stop surface for a washer 33 for the upper end of a spring 10, which is situated inside the sleeve 8 and surrounding pin 25. The bottom end of spring 10 abuts a stop-surface 32 inside the sleeve 8. Thereby sleeve 8 is restrictedly displaceable in the axial direction along pin 25 at the top of rod 5, but is non-rotatably arranged on pin 25 and is pressed downwards against the top surface 34 of the fuel rod 5 by the spring 10. When the control rod is in its topmost position (as shown in FIG. 1), the locking sleeve 8 is at the upper end of the guide tube 7. From FIG. 2, which shows a cross-section of the control rod along the line II—II in FIG. 1, it is seen that a locking ring 11, having the same contour as the guide tube 7, is situated inside the guide tube and fastened to the locking sleeve 8 by means of bars 34 secured to the tube 8 and ring 11. There is a narrow slot 35 between the guide tube 7 and the locking ring 11, and the sleeve 8 can move up and down inside the guide tube 7. The cooling water passing upwardly in the space between the rod 5 and the tube 7 can pass through the spaces 36 between the bars 34. As long as the locking ring 11 for the tube 8 is inside the guide tube 7, the control rod is locked against turning but displaceable upwards and downwards under the influence of the reactor control drive for the control rods. This control drive is already well-known and therefore is not shown.

When the control rod is to be removed, the control tube 8 is lifted against the action of the spring 10, for example by a gripping member which engages in recess 36 in the sleeve 8, so high that the locking ring 11 is located above the upper end of the guide tube. After this, the control rod is turned so that the bayonet holder releases its hold and the rod can be pulled up.

If circular guide tubes are used, as shown in FIG. 3, the guide tubes can be provided with a pair of longitudinal internal ribs 12. The tube 8' is then provided with a number of corresponding projections 13 which prevent the tube from turning as long as the projections 13 are within the guide tube. In the same way as described in connection with FIG. 2, the control rod 5 and the locking tube 8' are released for turning as soon as the tube has been lifted up so high that the projections 13 are free of the ribs 12.

The two embodiments now shown have the advantage that the assembly can be removed even if it should be impossible, for some reason, to operate the locking means. Then the rod can be turned and removed without its being necessary to displace the tube 8.

FIGS. 4 and 5 show schematically how four control rods 5 in a fuel assembly are attached to a yoke 6, this being operated upward and downward by a control drive not shown. The yoke is provided with a hub 14 in which the drive bar 15 is attached. From the hub 14 four arms 16 extend, said arms supporting at their outer ends fastening plates 17 for the fastening devices of the control rods, said fastening devices being shown here as bayonet joints comprising a slot 18 in the fastening plate and corresponding cam projections 19 on the control rod. The design of the locking device as a bayonet joint is shown only to exemplify the idea of the invention, and other previously known locking devices, threaded screws, spring lock and the like could be used.

FIGS. 6 and 7 shows how four adjacent fuel assemblies 1 are brought together to form a group and arranged in such a way that their control rods are adjustable simultaneously with the help of one single drive bar 20 which is connected to a group yoke 21 common for the whole group, as shown in FIG. 7. The group yoke has four arms 22, each arm supporting an assembly yoke 23 of the type shown in FIG. 5. In order to make possible change or inspection of individual assemblies within the group, the assembly yoke 23 should be detachably attached to the group yoke. This attachment could be constructed by providing an operating rod 24, which is positioned in the center of each assembly, its lower end with a fastening device of, for example, the kind mentioned previously and giving the operating rod such a length that it reaches and preferably lies above the upper surface of the fuel assembly when the control rods are in their upper position and, therefore, easily accessible from above. Also this operating rod should be provided with a locking device, so that the assembly yoke cannot be detached unintentionally from the group yoke. The operating rod could consist of an ordinary finger control rod or be constructed of a material with the least possible neutron absorption, in the event it is not to affect the course of the reactor. In the latter case, the operating rod can be made so as to be removed from the fastening device after the desired operation has been carried out.

In an embodiment of the invention as shown in FIGS. 6 and 7, the whole assembly yoke 23 is lifted together with the assembly when the assembly is removed from the reactor. The control rods can therefore be attached to the yoke by means of, for example, welding or any other suitable attachment method.

Instead of the locking device shown in FIGS. 1, 2, and 3, locking of control rods and operating rods can be accomplished with the help of springs actuating, for example, square parts of the rods. When the locking device is to be made inactive, the rod is turned against the action of the springs so that the springs come to lie above the diagonal on the square part. In this position, the fastening device is open so that the rod can be removed. Locking devices of this kind are so well-known that they need no further explanation.

We claim:

1. In a nuclear reactor of BWR type, having a fuel assembly and a finger control rod having a longitudinal axis movable between upper and lower positions with respect to said fuel assembly, at least one member movable in the direction of the longitudinal axes of the control rod, and means releasably securing said control rod to said member, said assembly and said control rod having cooperating means thereon responsive to the position of the control rod with respect to the fuel assembly to permit release of said locking means only when said control rod is moved to its upper position with respect to said fuel assembly.

2. In a nuclear reactor as claimed in claim 1, said fuel assembly having a single member, a plurality of control rods being connected to said member.

3. In a nuclear reactor as claimed in claim 1, said securing means including locking means releasable by turning of the control rod about its longitudinal axis, and means for preventing turning of the control rod when said rod is below its upper position.

4. In a nuclear reactor as claimed in claim 3, having a guide tube for the control rod, said means for preventing turning including cooperating means on the tube and the rod.

5. In a nuclear reactor as claimed in claim 4, said means for preventing turning including a sleeve slidably and non-rotatably mounted on the control rod and having a portion constituting a part of said cooperating means, said sleeve and tube having cooperating means thereon to prevent turning of the sleeve as long as it is engaged within the tube, said sleeve being movable out of the tube in the upper position of the control rod to release said prevention turning means.

6. In a nuclear reactor as claimed in claim 5, spring means urging said sleeve into the tube.

7. In a nuclear reactor as claimed in claim 5, said tube being noncircular and said sleeve having a portion fitting into the tube and non-turnable therein.

8. In a nuclear reactor as claimed in claim 5, said tube being circular and having inwardly directed ribs extending longitudinally thereof and said sleeve having projections engageable with the ribs.

* * * * *